Feb. 9, 1965     J. H. HOWARD     3,169,186
OPTICAL CODED DOCUMENT READER
Original Filed April 9, 1956

INVENTOR.
JOHN H. HOWARD
BY
AGENT

United States Patent Office 3,169,186
Patented Feb. 9, 1965

3,169,186
OPTICAL CODED DOCUMENT READER
John H. Howard, Media, Pa., assignor to Burroughs Corporation, Detroit, Mich., a corporation of Michigan
Original application Apr. 9, 1956, Ser. No. 577,143, now Patent No. 2,975,966, dated Mar. 21, 1961. Divided and this application July 7, 1960, Ser. No. 41,349
11 Claims. (Cl. 250—71)

This invention relates to an improved data handling system using spots of fluorescent material for data recording and a combination of high energy light irradiation and photo sensitive scanning to read the recorded data, and is a division of applicant's co-pending application entitled "Coded Document Reader," Serial No. 577,143, filed April 9, 1956, now Patent No. 2,975,966.

Data handling poses a serious problem in many fields. It is acute in the banking industry which faces a phenomenal increase in the volume of activity in the handling of checking and savings accounts. Currently there is excessive manual work involved in the processing of checks and savings records. Automation would relieve this problem. The basic detailed activities involving the receipt and the payment of funds are not the point of critical concern. It is in the necessary maintenance of the records relating to deposit accounting that the serious problem arises. Some method and equipment is needed to provide a data link to centralized accounting offices for this processing.

Another problem area has arisen in the field of ticketing for rail and air transportation. For each ticket sold there is a need to record the serial number of the ticket and the numerical code representing the nature of the trip sold. Central accounting needs this basic information for interline billing, revenue accounting, and for figuring the tax due in the various states or countries through which a trip passes.

Still another problem area is currently emerging in the handling of vast volumes of information for organizations such as government departments and various military or naval staffs. In this area it is felt that classification and reduction of raw information preparatory to filing or analysis could be greatly accelerated and improved in reliability through automation techniques.

Throughout many of the data handling problem areas for which automation appears desirable, there is an interest in preserving certain well established forms, documents and other printed material which have a wide acceptance and where the development of substitutes would be both expensive and of questionable advantage. The pass books, deposit tickets and withdrawal orders in a savings bank operation are typical of such items. Accordingly it is considered advantageous to utilize fluorescent materials for practically invisible printing or coding on such documents which under ordinary light is invisible and does not interfere with the ordinary matter printed thereon. This luminescent material could be irradiated with high energy invisible radiation such as actinic rays, ultraviolet light or soft X-rays, and the resulting luminescent radiation utilized in the data reading and recording operation.

Difficulties arise in the use of luminescent materials in that many substances have some degree of fluorescent quality. Bleaches that are used in paper, inks used in the normally legible printed matter thereon, smudges from greases and other foreign materials acquired during processing and handling are typical of unwanted sources of luminescent signals which will appear on such records which are exposed to high energy radiation. These spurious signals add to the background noise level and reduce the signal-to-noise ratio of desired signals and may even present such as spurious level as to introduce a false signal. The present invention is employed to read luminescent codings on records in a manner which enhances the signal-to-noise ratio. Throughout the description of this invention, the reading of coded data on a document will be referred to as "scanning," inasmuch as the data is recorded in a pattern of phosphorescent dots interspersed with areas or spots in which no phosphorescent material has been deposited and these areas must be examined or scanned. Scanning comprises the exposure of a photosensitive means to this recorded data pattern (when in an excited and radiating state) either in a predetermined sequence or with a matrix of photosensitive pickups wherein their positions correspond to particular parts of the data pattern.

An object of this invention is to provide an improved data handling system.

Another object of this invention is to provide an improved reading device for data recorded by phosphorescent materials.

A further object is to provide an improved signal-to-noise ratio in a luminescent scanner, wherein high energy radiation and electrical fields incidental to the generation of this high energy radiation and spurious short-persistence fluorescence are eliminated from the background level of the signal which is picked up.

In accordance with one feature of this invention, there is provided an improved photoelectric data irradiating and reading method and apparatus, having a radiation source for producing high energy photons to irradiate the document carrying the data, recording the data in long-persistence phosphorescent materials, exciting this phosphorescent material with this radiation and removing the radiation in a predetermined time interval before scanning, and scanning to read the phosphorescent light which persists after short-persistence fluorescence from unwanted or spurious materials has subsided.

The foregoing and other objects of this invention will be readily understood from the following specification and claims together with the accompanying drawing wherein:

FIG. 1b is a diagram of an amplifier useful in the system shown in FIG. 1a;

FIG. 4b is a side elevation view of the optical system of FIG. 4a.

In the following description, "phosphorescence" is used for the signal luminescence having a long persistence after excitation by a radiant source and "fluorescence" is used for the noise luminescence having little or no persistence after the radiation expires. A typical phosphorescent material comprises zinc sulphide and small percentages of added material such as silver, with a persistence time in excess of many microseconds; and a typical fluorescent material is anthracene with a persistance time in the order of one microsecond or less.

Figure 1A:
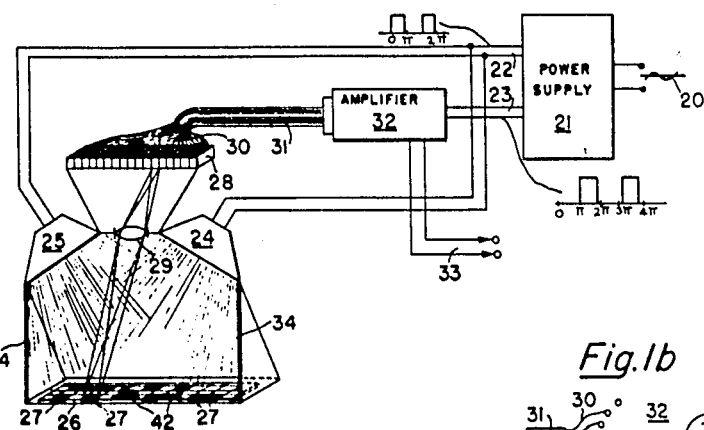
FIG. 1a is a functional diagram of an electrically controlled system constructed in accordance with this invention.

Referring to FIG. 1a, an alternating voltage 20 is utilized for synchronization of units as well as for supplying operating power. Any conveniently useful voltage and frequency may be used, consistent with required irradiating and scanning periods and the frequency limitations of various units. Power supply 21 provides alternate half cycles to output circuit 22 and the other alternate half cycles to output circuit 23, so that the two sources of irradiation 24 and 25 are excited together but alternately with amplifier 32 as to their respective on and off periods. While square waves are shown as the input signals on leads 22 and 23, other waveforms also are useful. Further, the duty cycle on each pair of leads is less than 50%, or less than a half cycle so as to provide a predetermined time interval between irradiation and scanning, during which the radiation from unwanted fluorescence and other noises subsides before the desired radiation from long-persistence phosphorescent material is read.

The amplifier 32 may be of the type found in conventional data processing systems. As shown diagrammatically in FIG. 1b, the input leads 30 are connected to contacts of selector 19 and the amplifier input circuit is connected to these contacts in a predetermined sequence so that the presence or absence of a signal, as determined by the presence or absence of light on photocells of the scanning matrix 28, generates a digital signal which is amplified and applied to leads 33. When sources 24 and 25 are on, amplifier 32 is off; and when sources 24 and 25 are off, then the amplifier 32 is on and is responsive to signals from photocell assembly or matrix 28 which in turn has a plurality of photocells, each of which is separately responsive to incident radiation from a particular area or cell on the surface of document 26, which is shown in perspective in FIG. 1a and in plan view in FIG. 1c and which appartaus forms the subject matter of the claims in the present divisional application. Data is represented in coded form on the document 26 by the presence or absence of phosphorescent spots 27. Other unwanted sources of fluorescence are shown as randomly placed areas 42.

Radiant sources 24 and 25 receive energy through leads 22, producing high intensity radiation capable of exciting phosphorescence in the recorded phosphor spots 27 of document 26. Radiations which have been found useful in producing fluorescence and phosphorescence are ultraviolet light, actinic rays, and soft X-rays. In general, radiations of wave-lengths shorter than about 6,000 Angstrom units, or yellow light, are more useful because their energy per photon is higher. Sources 24 and 25 therefore represent producers of such well known radiations.

Figure 1B:
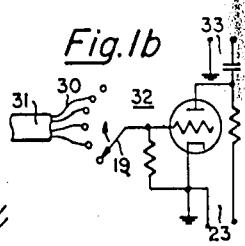
Figure 1C:
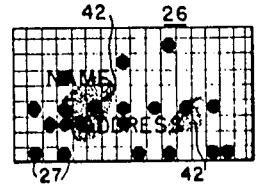
FIG. 1c is a plan view of a document and its coded data.

Document 26, as shown in FIG. 1c, utilizes both visible printed matter and invisible data recorded as spots 27 of a phosphorescent material, such as zinc sulphide. Document 26 has spots 27 arranged in a coding pattern arranged in a predetermined number of possible cell areas such as found in a matrix so as to present important information to supplement or confirm the visible printed information. Any well known optical system such as lens 29 of FIG. 1a serves to focus images of this document coding pattern upon a corresponding matrix 28 of photocells or phototransistors, which may be positioned generally in the focal plane of lens 29. A photosensitive pickup cell is positioned in matrix 28 for the image of each possible spot position of the pattern on document 26. When a small cell area on document 26 has phosphorescent material applied to form a spot 27, and irradiation has developed a detectable output radiation from spot 27, then lens 29 focuses this radiation upon the particular cell of matrix 28 which corresponds to that spot 27 on document 26. The signals generated by cells activated in this manner are fed by leads 30 of cable 31 to amplifier 32, which serves to produce corresponding output signals at the leads 33.

Because they are invisible without processing and do not interfere with visible printed data on document 26, spots 27 can be of comparatively large area and therefore positioning of document 26 is not critical. As an alternative to large-area spots, amplifier 32 can be constructed to be responsive to particular signals generated by the scanning of particular patterns of spots 27 and of spaces on the document having no phosphorescent material. In this further case, the matrix 28 should extend to a greater number of positions along each co-ordinate than document 26 requires, so positioning still would not be critical, even though the relative positioning of cells in matrix 28 and of spots on document 26 could be a precise, fine-detailed pattern. This can be visualized by regarding the pattern or spots 27 shown on document 26 in FIG. 1c. A separate photocell of matrix 28 will be energized for each spot 27 shown. Then, when the sampling switch of amplifier 32 contacts leads 30 in sequence, a particular sequence or "signal" and "no-signal" intervals will be generated, which is characteristic of the pattern of spots 27 on document 26. Equipment can be made responsive to particular sequences, just as teletype equipment responds to teletype signal sequences, and not be sensitive to which of leads 30 are used to produce this sequence. In other words, the number of photocells in matrix 28 exceeds the number of coding areas on document 26, so document 26 has a wide tolerance on its position beneath lens 29 in which scanning will produce the desired sequence even though varying the position of document 26 will vary the actual separate photocells transmitting the sequence via lines 30. Thus the sequence and hence the digital signal on leads 33 would not be destroyed by mispositioning of the document.

In addition to the desired luminescent material in spots 27, other unwanted luminescent areas 42 also are present. Areas 42 on the document are used to designate areas containing unwanted fluorescent materials such as dirt, grease, smudges, chemical residues, etc. Usually, they are of short-persistence fluorescence, as contrasted to spots 27 which are of long-persistence phosphorescence.

As shown in FIG. 1b, output signals are obtained from amplifier 32 at leads 33. The actual form of signals used is not pertinent to this invention. For example, output signals may be digital in nature, with the digital timing determined by sampling switch of amplifier 32, and the "on" or "off" signal status determined by energization of photocells in matrix 28 applying voltage to particular ones of leads 30. This sampling switch must scan all leads 30 during each duty cycle as fixed by energization of leads 23. These duty cycles are time-shared with duty cycles for radiation sources 24 and 25. This time-sharing mode of operation presents marked improvements in the reading of normally invisible, luminescent markings. With radiant energy sources 24 and 25 and amplifier 32 connected for continuous rather than time-sharing operation, severe noise levels or masking background signal would be encountered, under some conditions. Analysis shows three main noises to be present: (a) Scattered or diffuse reflection of the incident radiation back to photosensitive matrix 28; (b) radiation from unwanted fluoresence of bleaches, smudges and other foreign materials in areas 42 on the document; and (c) electrical field noise generated in the activation of radiation sources, and picked up in the matrix 28 or its wiring 30. When the source of irradiation is turned off, all of these noises subside very rapidly; much more rapidly than does the radiation from the phosphorescent spots 27 which are of long persistence. Accordingly, spots 27 continue to energize cells of matrix 28 after background noise subsides, providing a marked improvement in signal-to-noise ratio over prior art reading techniques. Preferably a light-tight enclosure—shown here, for illustrative purposes, with the front wall removed—is provided by walls 34 surrounding the document-scanning position and connected to the structure of sources 24 and 25 to reduce any reflection, excitation or diffusion from externally incident radiant energy.

Figure 2:
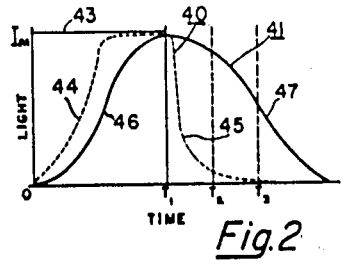
FIG. 2 is an intensity-vs.-time plot of fluorescent and phosphorescent response to radiant energy.

FIG. 2 illustrates the time relationships of the novel mode of operation suggested by the present invention.

Radiation sources 24 and 25 are on for the pulse period 43 from zero (0) to $T_1$, during which all fluorescent materials 42 rise to a radiation output amplitude related to the incident radiation, as shown by the leading edge 44 of waveform 40. During this same interval, 0 to $T_1$, all fluorescent materials of spots 27 also rise to a maximum radiation output related to incident radiation as shown by the leading edge 46 of waveform 41. For convenience, these are indicated as a common level Im reached under sustained irradiation at time $T_1$. The radiation sources 24 and 25 are cut off at time $T_1$, and the photosensitive pickup system of photocell matrix 28 and amplifier 32 is energized at time $T_2$. During this interval $T_1$–$T_2$, the unwanted fluorescence of dirt, chemical residues, dirt, etc., shown on the document as spots 42 will decay rapidly. The trailing edge 45 of curve 40 shows a typical radiation decay curve for such fluorescent materials as spots 42. Contrasted to curve 40, the decay time for phosphorescent materials in coded spots 27 is considerably longer, as shown by the trailing edge 47 of curve 41. Beginning at time $T_2$, and for a period $T_2$–$T_3$, the photocell matrix 28 responds to radiation from spots 27 and amplifier 32 responds to the signals from matrix 28. Since a delay time has been provided during which radiation from unwanted fluorescence has subsided, there will be little or no signal from areas 42. From an examination of curves 40 and 41 it can be seen that the ratio of signal (curve 41) to noise (curve 40) during this period $T_2$–$T_3$ is increased considerably over that in systems employing continuous irradiation. To this is added the increase in ratio of wanted signal to unwanted radiation and noise, arising from removal of incident irradiation and electrical noise which also affect the signal-to-noise ratio adversely.

Figure 3:
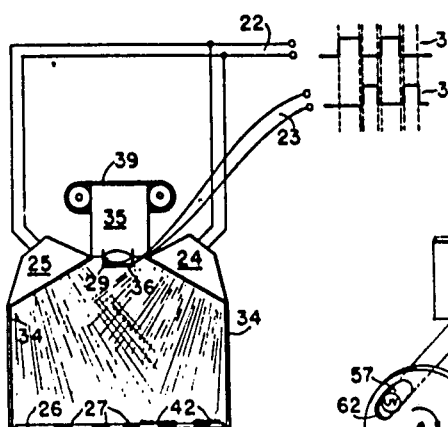
FIG. 3 is a functional diagram illustrating photographic scanning and recording techniques as utilized in this invention.

In lieu of an electrical output signal at leads 33, the photosensitive pickup matrix 28 can be replaced by a recording camera 35, as shown in FIG. 3. Camera 35 is mounted with an electrically actuated shutter 36 functioning to open for passage of radiation when a voltage is applied to leads 23. Radiation sources 24 and 25 function as described before. When X-rays are used, appropriate shielding must be included in housing 34 and around the camera 35. The time relationship between voltages applied to leads 22 and 23 is shown by waveforms 37 and 38. The radiation sources 24 and 25 irradiate document 26 during a pulse of wave 37. After this irradiation, shutter 36 is opened and the film 39 in camera 35 is exposed to the phosphorescent radiation from spots 27. The contrast characteristic of film 39 can be selected to provide maximum discrimination against the lower level light from the unwanted fluorescent materials, shown as curve 40 in FIG. 2, and maximum emphasis of the higher level light from the phosphorescent materials of spots 27, shown as curve 41 in FIG. 2. It is evident that with film 39 and document 26 statically positioned, the waveforms 37 and 38 will actuate radiation sources 24 and 25 and shutter 36 to produce multiple exposures which emphasize the long-persistence phosphorescent radiation from spots 27. However film 39 can be fed automatically by mechanisms such as that in the commercially available "Robot" camera and documents also can be fed in an automatic manner. Both automatic feeds can be triggered or driven by waveforms 37 and 38, through solenoids or quick starting electric motors, in ways well known to those skilled in the art. Such automatic feed of film and documents would be useful to record a number of documents when a single high-intensity irradiation of a document and subsequent exposure of the film produces adequate density of the resulting photograph. Further, a manual switch could be used to switch a voltage source from a normal position on line 22 to a scanning position on line 23. As this switch is actuated, radiation sources 24 and 25 are cut off, fluorescence of areas 42 subsides, leaving phosphorescence of spots 27, and shutter 36 is opened to record the radiation from spots 27.

Figure 4A:
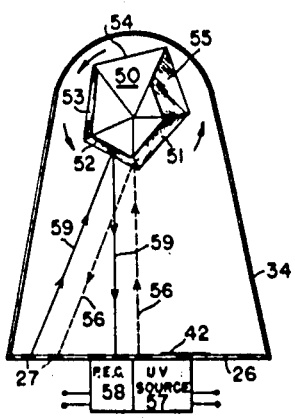
FIG. 4a is a front view in diagrammatic form of an optical system which may be utilized in accordance with this invention.
Figure 4B:
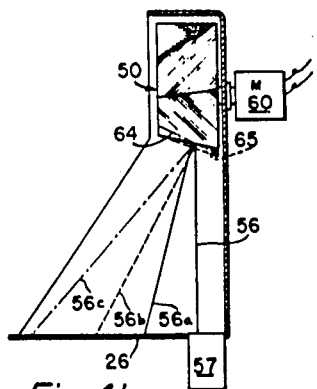

As shown in FIGS. 4a and 4b, and in accordance with the form of the present invention claimed in the parent application identified above, the time delay between irradiation and scanning, necessary to permit unwanted fluorescence to subside before desired phosphorescence is scanned, is provided by an optical system. FIG. 4a is a front elevation view of a housing 34, with its front wall removed, for a rotating mirror assembly 50, with document 26, radiation source 57, and photoelectric cell 58 facing the mirror assembly as shown. With reference to FIG. 4b it will be seen that source 57 and cell 58 are immediately below document 26 and that rotating mirror assembly 50 is driven by motor 60. Mirror assembly 50 comprises five plane mirrors 51 to 55 mounted around the axis of rotation to form a pentagon. It is evident that either greater or lesser numbers of mirrors could be so mounted, forming a triangle, square, hexagon, etc. Each plane mirror 51 to 55 is tilted at an angle relative to the axis of rotation of mirror assembly 50 which is different from the tilt angle for other mirrors, so that each mirror reflects a ray from source 57 to a different area of document 26, as will now be described.

Radiation source 57 includes a collimator to align its outgoing radiation into ray 56. Ray 56 strikes whichever mirror of mirrors 51 to 55 is positioned to reflect it. As shown in FIG. 4a, mirror 52 is in such a position and reflects ray 56 back to document 26. Photocell 58 also includes a collimator aligned with ray path 59. In effect, photocell 58 can "see" only the small area of document 26 aligned with ray 59. With mirror assembly 50 rotating counterclockwise as shown in FIG. 4a, the portions of rays 56 and 59 from mirrors to document 26, will sweep across the document from left to right. If the planes of all mirrors 51 to 55 were mounted at the same angle relative to the axis of rotation, then the successive sweeps of rays 56 and 59 across document 26 would be on the same path across the document for reflection from each mirror. However, each mirror has its plane at a different angle relative to the axis of rotation. These differing angles of tilt are shown as dotted lines 64 and 65 in FIG. 4b. Only two such angles of tilt are shown to simplify the drawing. Line 64 of less tilt than line 65 is the plane of mirror 54 of minimum tilt angle, while line 65 would be for mirror 55 of maximum tilt angle.

As shown in FIG. 4a, mirror 54 has minimum or zero tilt, mirror 53 has next larger tilt angle, mirror 52 has next larger tilt angle, and so on until the last successive mirror, mirror 55 of the pentagon, is reached. Then the first mirror 54 again comes around to return the rays to the path for minimum tilt angle. As shown in FIG. 4b, this axial tilt causes the rays 56a, b and c together with their corresponding rays 59, for radiant energy and for the "viewing ray" of theh photocell respectively, to sweep document 26 along a different line for each mirror. Line 56a is the ray path from mirror 54 to document 26, line 56b is the ray path from mirror 52 to document 26, and line 56c is the ray path from mirror 55 to document 26. Accordingly, it is evident that, in addition to the sweep of rays 56 and 59 across the document from left to right as seen in FIG. 4a, there is a displacement of each sweep to a separate path as shown in FIG. 4b, as motor 60 rotates the mirror assembly 50. Because of the spaced relation of rays 56 and 59 and the direction of rotation of mirror 50, ray 59 or the viewing ray of photocell 58 sweeps over any given area of document 26 shortly after that spot is irradiated by ray 56. The speed of rotation of mirror 50 can be utilized to adjusted the time interval between irradiation and scanning. Motor 60 is preferably provided with a variable speed drive for this purpose. However, in determining a speed of rotation needed for a given sweep speed of rays 56 and 59 across document 26, it must be remembered that the angular velocity of the rays sweeping across document 26 is twice the angular velocity of mirror system 50. This relation exists because the angle of incidence equals the angle of reflection and the source and document are both stationary. Consider movement of the mirror through, say, 5 degrees rotation. This changes the angle of incidence of a ray the same 5 degrees. This in turn changes the ray's angle of reflection another 5 degrees, so the angle between incident and reflected rays has changed 10 degrees.

With this optical method of introducing a time delay between irradiation and scanning so that fluorescence can subside, it is unnecessary to gate with electrical signals the source 57 or detector device 58. The output signal from detector device 58 will be dependent upon spot-scanning speeds, spot distribution on the document, and persistence time for spots 27. The first two parameters generate the signals conveying the information stored in the spots, and the last parameter affects the ratio of this signal to background noise, the noise including radiation from unwanted fluorescene. As shown in FIGS. 4a and 4b, with a multi-sided mirror and with each mirror tilted to scan a different line or zone of the document, a large matrix of digitally coded information can be scanned in a very short interval to develop serially presented electrical signals at the photocell 58. The number of separate lines from which coded data may be read, as seen in FIG. 4b, is determined by the number of differently tilted plane mirrors in mirror system 50. Each tilt angle places the ray paths on a different line. The output signals of detector device 58 will be digital in nature, due to the scanning sequence of the ray paths generated by rotating mirror system 50.

Figure 5:
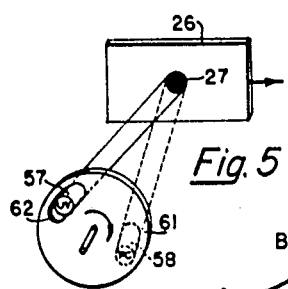
FIGS. 5 and 6 are detailed sketches of devices featured in the invention.
Figure 6:
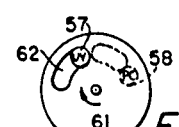

Time sharing between irradiation and scanning may be provided mechanically in the embodiment shown in FIGS. 5 and 6, and as claimed in co-pending divisional appliction of the above-identified parent application Serial No. 41,350, filed July 7, 1960, now Patent No. 3,051,836. Disc 61 is rotated, presenting aperture 62 first to radiation source 57 and then to the photosensitive pickup device 58 which are the same general types as those used in FIGS. 4a and 4b. For more adequate scanning, a plurality of apertures can be provided and the source and pickup positioned to insure that irradiation is cut off before the pickup cell is exposed to luminescent sources of radiation. In this interval between irradiation and exposure of the cell, unwanted fluorescence subsides and then the desired phosphorescence from spot 27 activates the photosensitive pickup more reliably due to the reduced background noise, providing an enhanced signal to noise ratio. Scanning is provided either through motion of document 26 or by conventional Nipkow disc techniques, with rotation of disc 61 providing very frequent "looks" at document 26 so no spots 27 or untreated areas for such a spot are missed as either document 26 or the disc aperture pattern is moved. Since the exposure of photocell 58 is in short, frequently repeated intervals, it provides a basic signal frequency when radiation is received, so a digital signal is provided on an alternating "carrier" voltage, the frequency of which is determined by the frequency of passage of aperture 62.

From an examination of these embodiments of this invention it is seen that the reading of data which has been deposited in luminescent material upon a document is markedly improved in reliability and in the reduction of errors or spurious signals through the use of long-persistence material for such data and in reading the radiation from this material after it is no longer exposed to irradiation and short-persistence luminescence from unwanted luminescence sources has subsided. As in most communication systems of limited intrinsic resolving power, increase in the signal-to-noise ratio can be depended upon to improve reliability of the system's performance.

What is claimed is:

1. Apparatus for reading a document upon which data is coded in a pattern comprising a plurality of discrete areas of long persistent luminescent materials and upon which short persistent luminescent material may be deposited incident to processing and handling of said document, said apparatus comprising means simultaneously to irradiate the materials on said document, detector means to receive radiation from said coded pattern of materials on said document, and means to control said irradiating means and said detector means in a manner operable to establish predetermined time periods between irradiation of said material and radiation reception to enable said detector means to respond only to radiation from said long persistent luminescent materials and only after radiation from said short persistent luminescent materials has subsided, said control means causing said irradiating means to be energized for an appropriate time period and thereafter de-energized to permit radiation from said short persistent luminescent materials to subside, said control means further causing said detector means to respond after a predetermined time period to radiation from said long persistent luminescent materials and in the absence of any additional irradiating source, said detector means comprising means positioned in an optical system and operable simultaneously to record the whole pattern of long persistent luminescent materials deposited on said document.

2. Apparatus for reading a document upon which data is coded in a pattern comprising a plurality of areas of long persistent luminescent materials and upon which short persistent luminescent materials may be deposited incident to processing and handling of said document, said apparatus comprising, means to irradiate the materials on said document, detector means to receive radiation simultaneously from all the distinct areas of the pattern of coded data on said document, and means to control said irradiating means and said detector means in a manner operable to establish predetermined time periods between irradiation of said material and radiation reception to enable said detector means to respond to radiation from said long persistent luminescent materials only after radiation from said short persistent luminescent materials has subsided, said control means causing said irradiating means to be energized for an appropriate time period and thereafter de-energized to permit radiation from said short persistent luminescent materials to subside, said control means further causing said detector means to respond after a predetermined time period to radiation from said long persistent luminescent materials and in the absence of any additional irradiating source, said detector means comprising a plurality of photocells positioned in an optical system and each separately but simultaneously responsive to incident radiation from a particular area of said coded data pattern, and said photocells provide electrical signals representative of the pattern of long-persistent luminescent materials deposited on said document.

3. Apparatus for reading a document upon which data is coded in a pattern comprising a plurality of areas of long persistent luminescent materials and upon which short persistent luminescent materials may be deposited incident to processing and handling of said document, said apparatus comprising, means to irradiate the materials on said document, detector means to receive radiation simultaneously from all the distinct areas of the pattern of coded data on said document, means to control said irradiating means and said detector means in a manner operable to establish predetermined time periods between irradiation of said material and radiation reception to enable said detector means to respond to radiation from said long persistent luminescent materials only after radiation from said short persistent luminescent materials has subsided, said detector means comprising a plurality of photocells positioned in an optical system and each separately but simultaneously responsive to incident radiation from a particular area of said coded data pattern, said photocells providing electrical signals representative of the pattern of long-persistent luminescent materials deposited on said document, and an amplifier for receiving signals from said plurality of photocells and providing an output signal representative of said data, wherein said control means comprises an energizing means which energizes said irradiating means and said amplifier in separate and successive intervals.

4. Apparatus for reading a document upon which data is coded in a pattern comprising a plurality of areas of long persistent luminescent materials and upon which short persistent luminescent materials may be deposited incident to processing and handling of said document, said apparatus comprising, means to irradiate the materials on said document, detector means to receive radiation simultaneously from all the distinct areas of the pattern of coded data on said document, means to control said irradiating means and said detector means in a manner operable to establish predetermined time periods between irradiation of said material and radiation reception to enable said detector means to respond to radiation from said long persistent luminescent materials only after radiation from said short persistent luminescent materials has subsided, said detector means comprising a plurality of photocells assembled in a matrix corresponding to the pattern of the data coded in long persistent luminescent materials on said document, said photocells positioned in an optical system and each separately but simultaneously responsive to incident radiation from a particular area of said coded data pattern, said photocells providing electrical signals representative of the pattern of long-persistent luminescent materials deposited on said document, and an amplifier receiving signals from said plurality of photocells and providing an output signal representative of said data, wherein said control means comprises an energizing means which energizes said irradiating means and said amplifier in separate and successive intervals.

5. Apparatus for reading a document upon which data is coded in a pattern comprising a plurality of discrete areas of long persistent luminescent materials and upon which short persistent luminescent materials may be deposited incident to processing and handling of said document, said apparatus comprising, means simultaneously is irradiate the materials on said document, detector means to receive radiation from said coded pattern of materials on said document, and means to control said irradiating means and said detector means in a manner operable to establish predetermined time periods between irradiation of said material and radiation reception to enable said detector means to respond only to radiation from said long persistent luminescent materials and only after radiation from said short persistent luminescent materials has subsided, said detector means comprising means positioned in an optical system and operable simultaneously to record the whole pattern of long persistent luminescent materials deposited on said document, and wherein said control means comprises an energizing means which energizes said irradiating means and said optical recorder in separate and successive intervals.

6. An apparatus for recognizing articles bearing phosphorescent markings; said apparatus comprising: scanning means; excitation means, effective when energized for exciting the phosphorescent markings; means operatively associated with said excitation means for alternately energizing and de-energizing the excitation means while each of said phosphorescent markings is adjacent said scanning means; and a recognition channel operatively associated with said scanning means for producing a distinctive output in response to the after-glow emission of light from each one of said phosphorescent markings to said scanning means while said excitation source is de-energized after being energized.

7. Apparatus for recognizing an article bearing markings in the form of long persistent luminescent material, said apparatus comprising: means for irradiating the luminescent material on said article, detector means to receive radiation from said luminescent material on said article, and means to control said irradiating means in a manner operable to establish predetermined time periods of irradiation of said luminescent material separated by time periods of non-irradiation of said material in order to enable said detector means to respond to the radiation from the long persistent luminescent material during the time periods of non-irradiation, said control means causing said irradiating means to be alternately energized and de-energized for appropriate time periods and further causing said detector means to respond to radiation from said long persistent luminescent material during said time periods of de-energization and in the absence of any additional irradiating source, said detector means being positioned in optical relation to the article and being operable to provide a distinctive output in response to the emission from said long persistent luminescent material borne by the article while the irradiating means is de-energized.

8. The invention described in claim 7 characterized in that the detector means includes an assembly of photocells optically disposed to receive light from different portions of the article.

9. The invention described in claim 7 characterized in that the detector means is constituted by a camera capable of recording the radiation received thereby on a film.

10. Apparatus for recognizing an article bearing markings in the form of short and long persistent luminescent materials, said apparatus comprising: excitation means, effective when energized, for irradiating the luminescent materials on said article, detector means arranged to receive radiation from said luminescent materials on said article, and means to control said excitation means and said detector means in a manner operable to establish predetermined time periods of irradiation of said materials separated by time periods of non-irradiation of said materials in order to enable said detector means to respond only to the radiation from said long persistent luminescent material, said control means alternately energizing and de-energizing said excitation means for appropriate time periods and causing said detector means to be effective during the time periods of the de-energization of the excitation means in order to respond to radiation from only said long persistent luminescent material, and means operatively associated with said detector means for providing a recognizable output in response to emission from the long persistent luminescent material during a time period of de-energization of the excitation means.

11. Apparatus for recognizing an article bearing markings of long persistent luminescent material and upon which short persistent luminescent material may be deposited, said apparatus comprising means for irradating the luminescent markings on said article, detector means positioned in optical relation to the article in order to receive radiation from said luminescent markings thereon, and means to control said irradiating means and said detector means in a manner to establish time periods between irradiation of said luminescent materials and radiation reception therefrom in order to enable said detector means to respond only to radiation from said long persistent luminescent materials and after radiation from said short persistent luminescent materials has subsided, said detector means having means for producing a signal in response to the reception of radiation from said luminescent materials, and said control means governing the operation of said irradiating means and providing successive time periods of irradiation and non-irradiation of the luminescent markings on the articles and further governing the operation of the detector means so that it provides a distinctive output in response to the receipt thereby of radiation from the long persistent luminescent material during a time period of non-irradiation of the luminescent markings.

(References on following page)

References Cited in the file of this patent

UNITED STATES PATENTS

| | | |
|---|---|---|
| 2,240,844 | Goggin et al. | May 6, 1941 |
| 2,621,560 | Steinhardt | Dec. 16, 1952 |
| 2,636,992 | Aicher | Apr. 28, 1953 |
| 2,704,634 | Rauch | Mar. 22, 1955 |
| 2,742,631 | Rajchman | Apr. 17, 1956 |
| 2,756,343 | Johnson | July 24, 1956 |
| 2,794,945 | Cellmer | June 4, 1957 |
| 2,867,728 | Pollock | Jan. 6, 1959 |
| 2,888,570 | Toulmin | May 26, 1959 |
| 2,957,079 | Edholm | Oct. 18, 1960 |
| 3,027,830 | Yaeger | Apr. 3, 1962 |